United States Patent
Ratilainen et al.

(10) Patent No.: US 10,243,706 B2
(45) Date of Patent: Mar. 26, 2019

(54) INTERFERENCE CONTROL IN DUAL CONNECTIVITY

(71) Applicant: Telefonaktiebolaget LM Ericsson (publ), Stockholm (SE)

(72) Inventors: Antti Ratilainen, Espoo (FI); Helka-Liina Määttanen, Helsinki (FI); Vesa Virkki, Espoo (FI); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/573,169

(22) PCT Filed: May 12, 2015

(86) PCT No.: PCT/SE2015/050540
§ 371 (c)(1),
(2) Date: Nov. 10, 2017

(87) PCT Pub. No.: WO2016/182486
PCT Pub. Date: Nov. 17, 2016

(65) Prior Publication Data
US 2018/0091269 A1    Mar. 29, 2018

(51) Int. Cl.
*H04L 5/00* (2006.01)
*H04W 72/04* (2009.01)
(Continued)

(52) U.S. Cl.
CPC ............ *H04L 5/0032* (2013.01); *H04B 7/02* (2013.01); *H04L 5/00* (2013.01); *H04L 5/001* (2013.01);
(Continued)

(58) Field of Classification Search
CPC ......... H04L 5/0032; H04L 5/00; H04L 5/001; H04L 5/0082; H04L 5/0055; H04W 76/15;
(Continued)

(56) References Cited

U.S. PATENT DOCUMENTS 9,179,364 B2 * 11/2015 Ramkumar ........... H04W 28/10
9,768,942 B2 *  9/2017 Golitschek Edler Von Elbwart ............ H04W 72/0446

(Continued)

FOREIGN PATENT DOCUMENTS

EP          3026836 A1    6/2016
WO     2014113990 A1    7/2014
(Continued)

OTHER PUBLICATIONS

PCT International Search Report for International application No. PCT/SE2015/050540—dated Jan. 2, 2016.
(Continued)

Primary Examiner — Luat Phung
(74) Attorney, Agent, or Firm — Sage Patent Group

(57) ABSTRACT

The invention relates to a wireless device, network nodes and methods therein for handling interference. A method in a wireless device comprises receiving an Instant Uplink Access, IUA, grant from the first network node, which indicates at least a periodicity of a semi-persistent scheduling. The method further comprises, when having information to be transmitted in the UL to the first network node: determining whether being scheduled for UL transmission by the second network node in a resource associated with the IUA grant or not. The method further comprises: when not being scheduled: transmitting UL information to the first network node in the resource associated with IUA; and, when being scheduled: refraining from transmitting the UL
(Continued)

information to the first network node in the resource associated with IUA.

13 Claims, 10 Drawing Sheets

(51) Int. Cl.
*H04B 7/02* (2018.01)
*H04W 76/15* (2018.01)
*H04W 72/12* (2009.01)
*H04W 72/08* (2009.01)
*H04W 72/14* (2009.01)

(52) U.S. Cl.
CPC ......... *H04L 5/0082* (2013.01); *H04W 72/042* (2013.01); *H04W 72/1226* (2013.01); *H04W 76/15* (2018.02); *H04L 5/0055* (2013.01); *H04W 72/04* (2013.01); *H04W 72/082* (2013.01); *H04W 72/1278* (2013.01); *H04W 72/14* (2013.01)

(58) Field of Classification Search
CPC . H04W 72/042; H04W 72/04; H04W 72/082; H04W 72/14; H04B 7/02
See application file for complete search history.

(56) References Cited

U.S. PATENT DOCUMENTS

| | | | |
|---|---|---|---|
| 10,028,295 B2* | 7/2018 | Rosa | H04W 72/1221 |
| 2014/0241272 A1 | 8/2014 | Griot et al. | |
| 2016/0157256 A1* | 6/2016 | Tseng | H04W 72/1284 370/329 |
| 2016/0205704 A1 | 7/2016 | Aiba et al. | |

FOREIGN PATENT DOCUMENTS

| | | |
|---|---|---|
| WO | 2014 163576 A2 | 10/2014 |
| WO | 2015010602 A1 | 1/2015 |
| WO | 2015020607 A1 | 2/2015 |
| WO | 2015025953 A1 | 2/2015 |

OTHER PUBLICATIONS

PCT Written Opinion of the International Searching Authority for International application No. PCT/SE2015/050540—dated Jan. 2, 2016.
3GPP TSG-RAN WG2 #84; San Francisco, USA; Source: NTT DOCOMO, Inc, (Rapporteur); Title: Summary of email discussion [83bis#12]LTE/SCE: Capturing further evaluation results in TR 36.842 (R2-134429)—Nov. 11-15, 2013.
European Search Report, EP Application 16780374.1, dated Dec. 7, 2018, 9 pages.

* cited by examiner

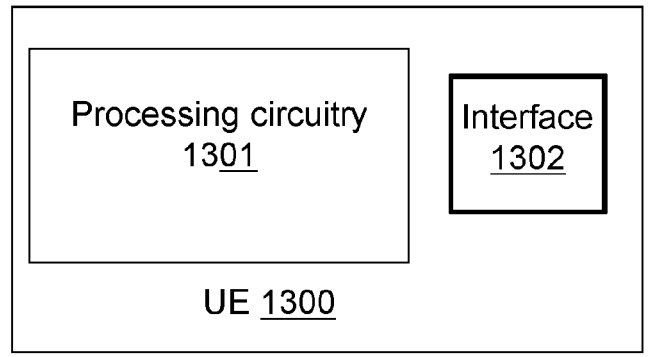
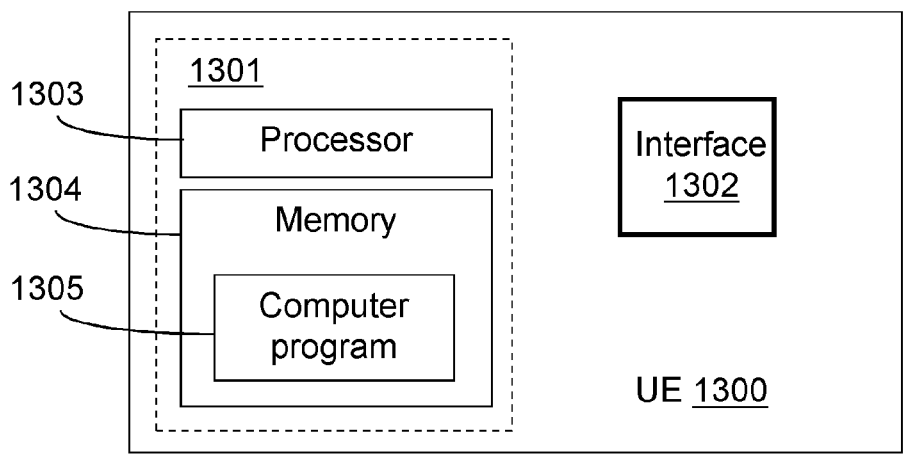
Figure 13a
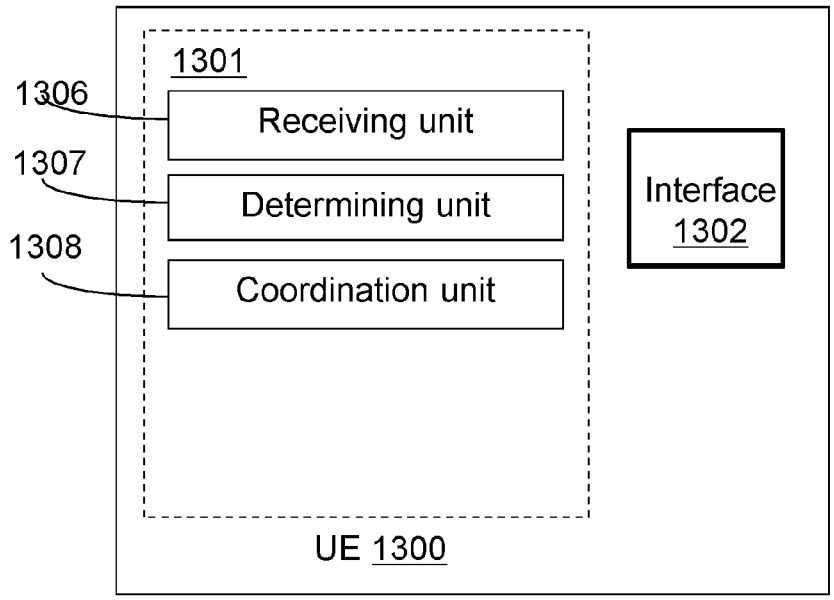
Figure 13b
Figure 13c

INTERFERENCE CONTROL IN DUAL CONNECTIVITY

PRIORITY

This nonprovisional application is a U.S. National Stage Filing under 35 U.S.C. § 371 of International Patent Application Serial No. PCT/SE2015/050540 filed May 12, 2015, and entitled "Interference Control In Dual Connectivity."

TECHNICAL FIELD

The invention relates to dual connectivity in wireless communication systems, and in particular to interference control in dual connectivity situations.

BACKGROUND

Dual Connectivity (DC) was introduced for LTE in Rel-12 for inter-frequency heterogeneous deployments, i.e. where macro and pico base stations operate on separate frequencies. By letting the UE transmit and receive data to and from two eNBs at the same time, peak bit rates can be increased by utilizing both frequency layers. By splitting the data higher up in the protocol stack, compared to carrier aggregation, non-ideal backhaul and independent scheduling in the eNBs is supported. Another use case of dual connectivity is control and user plane separation, where user plane data can be offloaded to the pico layer, while maintaining the control plane connection in the macro node. Thus, control and user plane separation may provide a mobility robustness of a macro deployment, while still allowing offloading gains of moving user plane traffic to the pico layer, which is also illustrated in FIG. 1.

Another use case for dual connectivity is uplink, UL, and downlink, DL, separation, where the user uplink is connected for example to pico cell and the user downlink is connected to macro cell. With the support for inter-frequency deployments, Rel-12 provides support for inter frequency UL/DL separation, but an intra-frequency case is not supported in Rel-12. Nevertheless, some studies show that intra-frequency UL/DL separation could provide much higher gains as compared to inter frequency UL/DL separation.

In heterogeneous networks, the eNBs have different DL output power, e.g., macro eNBs with high output power and pico eNBs with low output power. This imbalance in the transmission power combined with the conventional cell selection mechanism leads to at least two problems:

In LTE, Reference Signal Received Power-based (RSRP-based) cell selection is often used. In this scheme, UEs are associated with the cell from which the strongest DL power is received. As the macro eNB has higher output power than the pico eNB, UEs are more likely to connect to the macro cell. The pico cell size is thus relatively small as compared to the macro cell size, which can result in low UE uptake and small macro offloading by the pico cell. In addition to that, with the RSRP-based cell selection scheme some of the macro connected UEs experience a lower path loss to the pico eNB, and thus are not connected to the best cell from an UL perspective.

To increase offloading of the macro by the pico cells and to improve UL performance, there is a need to increase the size of the pico cells. This can be done with Cell Range Expansion (CRE) based cell selection, where a Cell Selection Offset (CSO) is added to the RSRP of the pico eNB before comparison.

With CRE, a UE may be connected to a pico cell even though the received DL power from the macro cell is stronger. In case of inter-frequency deployment, a large CSO is conceivable for the DL, but in case of intra-frequency deployment, applying a CSO introduces the additional challenge of strong interference. Alternatively to RSRP, Reference Signal Received Quality (RSRQ) can also be used for inter frequency cell selection.

As was discussed above, in heterogeneous networks the DL cell border and the UL cell border are at different places and hence the cell border cannot be set to optimize both UL and DL simultaneously. UL/DL split provides a means to tackle this issue by using dual connectivity to connect the uplink to one eNB and the downlink to another. In dual connectivity, in LTE terminology, one of these base stations is called Master eNB (MeNB) and the other one is called Secondary eNB (SeNB). The serving macro node or the high power node is usually the MeNB and the serving low power node is usually the SeNB, and with UL/DL separation it generally is beneficial to transmit the user data in downlink from the high power node and in uplink to the low power node, which usually is closer to the UE meaning less path loss.

The UL/DL separation can be done on several protocol levels, but since for 3GPP Release 12 the packet data convergence protocol (PDCP) level split architecture was approved for dual connectivity, the case being focused is the UL/DL separation based on PDCP split. The working principle of PDCP level split can be seen in FIG. 2a.

If a UE capable of UL/DL separation has activated the UL/DL separation between two cells, it means that the uplink user application data is transferred via physical uplink shared channel (PUSCH) of one of those two cells, which will now be called the "uplink cell", usually the SeNB cell, while the downlink user application data is transferred via physical downlink shared channel (PDSCH) of the other cell, which now will be called the "downlink cell", usually the MeNB cell. Therefore, the user data will not be transmitted in the uplink of the downlink cell, and similarly the user data will not be transmitted in the downlink of the uplink cell. However, in the PDCP split architecture, the radio link control (RLC) signaling is bi-directional in both of these two cells which means that there is RLC related UL transmissions to both cells on PUSCH and PDSCH respectively.

In a company internal simulation of UL/DL separation the technology potential of UL/DL separation was compared with a reference case. In the reference case, the CSO was set such that DL performance was optimized. The figures resulting from the simulation then showed the gain potential by applying UL/DL separation to the reference case, i.e. by moving macro UEs' uplink to the pico. In a simulated inter-frequency scenario, the cell edge UL user throughput gains were 31% and 38% for low and medium load respectively. While for the intra-frequency scenarios, which are illustrated in FIG. 2b, the cell edge UL user throughput gains were 205% and 59% in low and medium load, respectively. The main sources of the gains seem to be an increased throughput due to a better uplink connection to a closer low power node and offloading traffic from a highly loaded macro cell to small cells with low load levels.

For Rel-12, intra frequency UL/DL separation was down prioritized in RAN2 based on open issues mainly regarding the physical layer realization, but also regarding the performance evaluations, which did not consider existing features, like e.g. ABS. What may also have impacted the decision was a strong focus on scenario #2 (inter frequency) for Rel-12. Nevertheless, even when down prioritized during the study item phase, we note that a form of UL/DL separation for inter frequency can be achieved with the split bearer by scheduling only UL via SCG and DL via MCG. However, the most gain potential for UL/DL separation is in intra frequency deployments, and thus support for UL/DL separation in intra frequency deployments is a possible improvement for future versions of the standard.

The Rel-12 user plane protocol architecture supports three different types of bearers, as shown in FIG. 3. The three bearer types are:

A bearer only served by MeNB, referred to as Master Cell Group (MCG) Data Radio Bearer (DRB), i.e. a DRB for which resources are provided by the Master Cell Group. This is depicted with a dashed outline in FIG. 3.

A bearer only served by SeNB, referred to as Secondary Cell Group (SCG DRB), i.e. a DRB for which resources are provided by the Secondary Cell Group. This is depicted with a dash-dot outline in FIG. 3.

A bearer served by MeNB and SeNB, referred to as split DRB. This is depicted with a dotted outline in FIG. 3.

The UL/DL separation described here is applied to the split bearer. This means that the UE has two RLC connections associated with the split bearer. Furthermore, there are two Medium Access Control (MAC) entities in the UE side in dual connectivity operation: UE side MAC entity is configured per Cell Group, i.e. one MAC for MCG and the other MAC for SCG (solid and dash-double-dot outlines in FIG. 3)

Radio Link Control (RLC) Protocol

The tasks of RLC include segmentation and concatenation, handling retransmission, the detection of duplicates and in-sequence delivery to higher layers. Essentially, the main responsibility of RLC is to transfer user data and signaling between the upper layers and the medium access control (MAC) layer. The RLC provides services for PDCP in the form of radio bearers. The data flows to and from the MAC layer are called logical channels. There is one RLC entity per radio bearer configured for a terminal. Therefore, in the UL/DL separation architecture shown in FIG. 2a, there are two RLC entities per UL/DL separated terminal, one entity for each cell connection. An RLC entity is configured in one of the three possible data transfer modes, which are Transparent Mode (TM), Unacknowledged Mode (UM) and Acknowledged Mode (AM). Only RLC AM is supported for the split bearer.

The RLC AM provides bidirectional data service, meaning that one RLC AM entity is able to both receive and transmit. This makes a feedback channel possible, and therefore enabling retransmissions, which is the most significant feature of a RLC AM.

An UL/DL separated terminal can use RLC AM in the downlink cell, which means that there will also be uplink transmissions in the downlink cell. In an RLC connection the transmitter will first transmit an RLC Packet Data Unit (PDU) to the receiver. The transmitter side will store this PDU in its buffer until it is acknowledged. The transmitter continues with further RLC PDU transmissions, until for example a polling bit is included in the transmission requesting an RLC Status Report (SR) from the receiver side. There are other triggers for the RLC SR as well, for example a fixed timer or a detection of a missing PDU. Then the receiver side transmits an RLC SR PDU towards the transmitter side. In the RLC SR the missing RLC data PDUs are indicated as well as whether it is ready to receive the next RLC PDU. After this the transmitter performs retransmissions of the missing PDUs and continues transmitting new PDUs, which are again ACKed/NACKed by the RLC SR from the receiver. See FIG. 4 for the RLC AM working principle.

The two RLCs of an UL/DL separated terminal are independent, transmitting according to the grants given by their respective cell schedulers. Therefore the two uplink transmissions may happen simultaneously, an RLC SR in the downlink cell and an RLC data PDU in the uplink cell. In intra-frequency DC this is problematic as the transmissions interfere with each other. In addition to RLC SRs, with Rel-12 architecture also RRC control signaling may be transmitted in uplink in the downlink cell causing the same problem as the uplink cell RLC data PDUs.

Instant Uplink Access

Instant Uplink Access (IUA) is a form of prescheduling to allow uplink transmission of data without SR. The IUA solution is based on the Semi-Persistent Scheduling (SPS) framework introducing a new UE condition, namely: "Do not transmit using the grant unless there is data in buffer". The IUA is a company internal concept. The IUA concept is briefly described here as it is used as part of the solution described herein.

It can be said that, to improve efficiency, IUA introduces two "IUA phases" in the CONNECTED state as depicted in FIG. 5a.

The first phase starts when the eNB grants the UE with an IUA grant. In this phase the UE has the ability of fast uplink access, but is operating in a low power consumption mode, e.g. DRX, and have poor link adaptation due to minimal communication between the UE and eNB. This phase is referred to as the "inactive" phase in FIG. 5a.

When the UE gets data to send, it transmits a Buffer Status Report (BSR) and whatever data that fits into the IUA grant. Having received the BSR, the eNB now has the information of UL data in the UE and can start scheduling the UE with dedicated grants. The UE enters the active phase which is similar to the case when an LTE Release-8 UE is granted resources, thus having good throughput and good link adaptation.

In more detail the operation of IUA is depicted in FIG. 6 and listed here:

1. The UE receives an IUA grant.
   a. The grant is Identified by an IUA C-RNTI
2. The UE acknowledges the IUA grant
   a. Using padding PDU if no data is available
      Then the eNB knows IUA grant is received and the eNB can adjust the link adaptation
3. After being granted IUA resources, no padding is sent if there is no data in the buffer
4. New data is created in the UE and put in the send buffer
   a. A BSR is triggered
5. UE transmits the BSR and data using the IUA grant
6. eNB sends an ACK on PHICH
   a. and a dedicated grant if motivated by the BSR
7. The UE transmits data using the dedicated grant
8. The IUA grant remains valid after the dedicated grants
   a. And can thus be used for subsequent data In LTE all transmitted data is scheduled beforehand both in downlink and uplink and the scheduling is done by the scheduler in the serving base station. Generally the two schedulers in the two serving base stations of the UL/DL separated UE are independent of each other meaning that they schedule the transmissions in their respective cells without taking into account the scheduled transmissions in the other cell.

In the case where the UL/DL separated UE has user data to transmit in uplink (which will be transmitted through the uplink cell) as well as RRC or RLC status report to transmit at the same time in uplink in the downlink cell, the schedulers in these two cells, being independent of each other, can schedule this user to transmit the aforementioned uplink transmissions at least partly within the same radio resource. This means that this user needs to transmit simultaneously to the two base stations with same frequency. In principle this is possible if the UE has dual Tx, that is it has two transmitters. However, since the UE has omnidirectional antennas, these transmissions are likely to cause heavy interference to each other. The uplink RLC status report transmission is perceived as interference in the base station of the uplink cell when receiving the user data, and the user data transmission is perceived as interference in the base station of the downlink cell when receiving the RLC signaling. This interference disturbs the reception of the wanted transmissions and may even cause errors in the reception. The situation is illustrated in FIG. 6.

SUMMARY

The problem described above for UL/DL separation can be solved by utilizing certain scheduling coordination mechanisms between MeNB and SeNB serving the UL/DL separated UE. The solution described herein is also applicable for avoiding or mitigating interference e.g. in other cases of dual connectivity. The proposed solution introduces scheduling coordination mechanisms which utilize periodic or dynamic scheduling based on Instant Uplink Access (IUA). An advantage of the proposed solution is that it obviates self-interference caused by simultaneous transmissions to multiple network nodes for a UE in dual connectivity.

According to a first aspect, a method is provided, which is to be performed by a wireless device when being connected to a first and a second network node. The method comprises receiving an IUA grant from the first network node, which indicates at least a periodicity of a semi-persistent scheduling. The method further comprises, when having information to be transmitted in the UL to the first network node: determining whether being scheduled for UL transmission by the second network node in a resource associated with the IUA grant or not. The method further comprises: when not being scheduled: transmitting UL information to the first network node in the resource associated with IUA; and, when being scheduled: refraining from transmitting the UL information to the first network node in the resource associated with IUA.

According to a second aspect, a wireless device is provided, which is operable in a communication network supporting dual connectivity. The wireless device is configured to, when being connected to a first and a second network node, receive an IUA grant from the first network node, indicating at least a periodicity of a semi-persistent scheduling. The wireless device is further configured to, when having information to be transmitted in the UL to the first network node, determine whether being scheduled for UL transmission by the second network node in a resource associated with the IUA grant or not. The wireless device is further configured to: transmit UL information to the first network node in the resource associated with IUA, when not being scheduled; and further to refrain from transmitting the UL information to the first network node in the resource associated with IUA when being scheduled.

According to a third aspect, a method is provided to be performed by a first network node operable in a communication network supporting dual connectivity. The method comprises, when serving a wireless device also being connected to a second network node: providing an IUA grant to the wireless device, indicating at least a periodicity of a semi-persistent scheduling; and further indicating the granted IUA to the second network node.

According to a fourth aspect, a first network node is provided, which is operable in a communication network supporting dual connectivity. The first network node is configured to, when serving a wireless device also being connected to a second network node: provide an IUA grant to the wireless device, indicating at least a periodicity of a semi-persistent scheduling; and further to indicate the granted IUA to the second network node.

According to a fifth aspect, a method is provided to be performed by a second network node operable in a communication network supporting dual connectivity. The method comprises, when serving a wireless device also being connected to a first network node: receiving an indication from the first network node of an IUA grant for the wireless device, the IUA grant being associated with at least a periodicity of a semi-persistent scheduling. The method further comprises refraining from scheduling the wireless device in the UL resources associated with the IUA grant.

According to a sixth aspect, a second network node is provided, which is operable in a communication network supporting dual connectivity. The second network node is configured to, when serving a wireless device also being connected to a first network node: receive an indication from the first network node of an IUA grant for the wireless device, the IUA grant being associated with at least a periodicity of a semi-persistent scheduling; and further to refrain from scheduling the wireless device in the UL resources associated with the IUA grant.

According to a seventh aspect, a computer program is provided, which comprises instructions which, when executed on at least one processor, cause the at least one processor to carry out the method according to the first, third and/or fifth aspect.

According to an eighth aspect, a carrier is provided, containing the computer program of the seventh aspect, wherein the carrier is one of an electronic signal, optical signal, radio signal, or computer readable storage medium.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

FIGS. 13a-13c illustrates implementations of a wireless device according to exemplifying embodiments.

FIGS. 14a-14c illustrates implementations of a second network node according to exemplifying embodiments.

DETAILED DESCRIPTION

Many examples given herein will be given in the context of intra frequency dual connectivity and UL/DL separation. Intra frequency dual connectivity related to UL/DL separation is used as an example scenario where the solution described herein can be applied. This type of examples are given to facilitate the understanding of the invention, and should not limit the possible use cases of the described methods. For instance, Rel-13 introduces uplink split for the split bearer, which means that the UE will be able to simultaneously transmit data to both a MeNB and a SeNB. The methods described herein could be applied in order to avoid possible interference situations also in such scenarios. In future standards, dual connectivity split bearer operation could be extended to same frequency operation. Such split bearer operation could be used to increase uplink diversity and thus improve robustness. The methods described herein could then be used to avoid cross-interference of the uplink transmissions. The solution described herein may also be useful in inter-frequency scenarios where simultaneous UL transmissions cross-interfere.

The solution described herein will mainly be described in a context of an LTE network, using LTE, or E-UTRAN, terminology. However, the solution may also be applicable for other radio access networks applying similar solutions for dual connectivity.

Exemplifying Embodiments

Below, exemplifying embodiments will be described.

Figure 1:
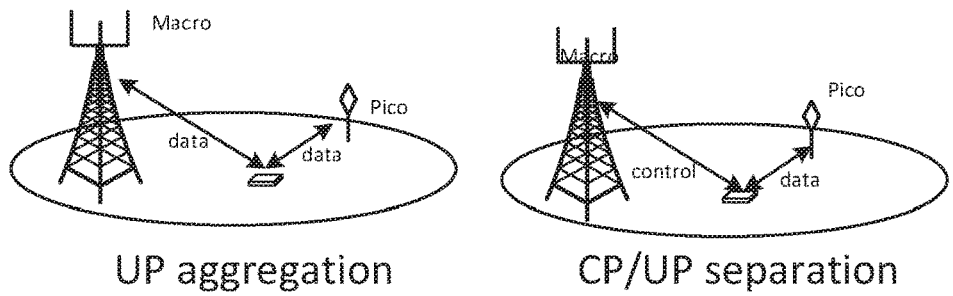
FIG. 1 illustrates dual connectivity according to LTE Rel-12.
Figure 2A:
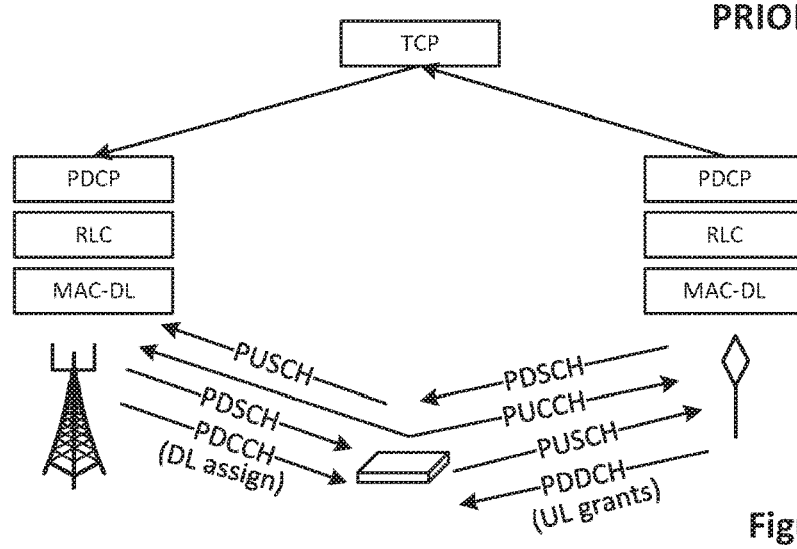
FIG. 2a illustrates UL/DL separation.
Figure 2B:
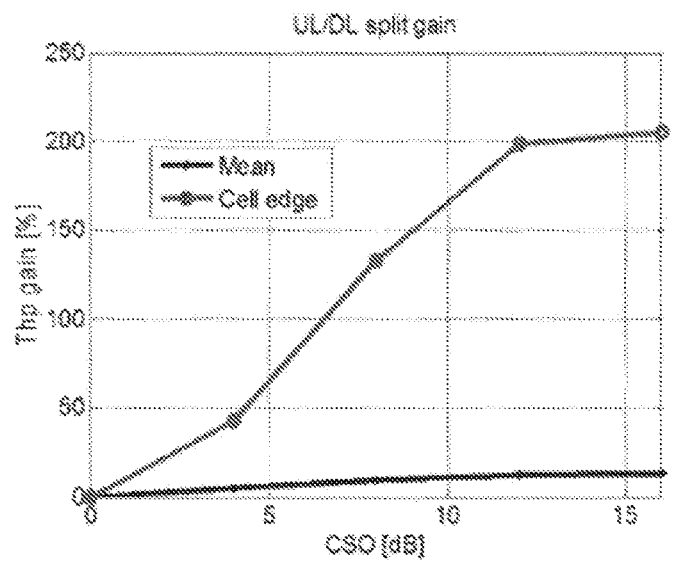
FIG. 2b shows a graph related to simulation results illustrating the potential of the technology in User Throughput gains vs. Cell Selection Offset (CSO).
Figure 3:
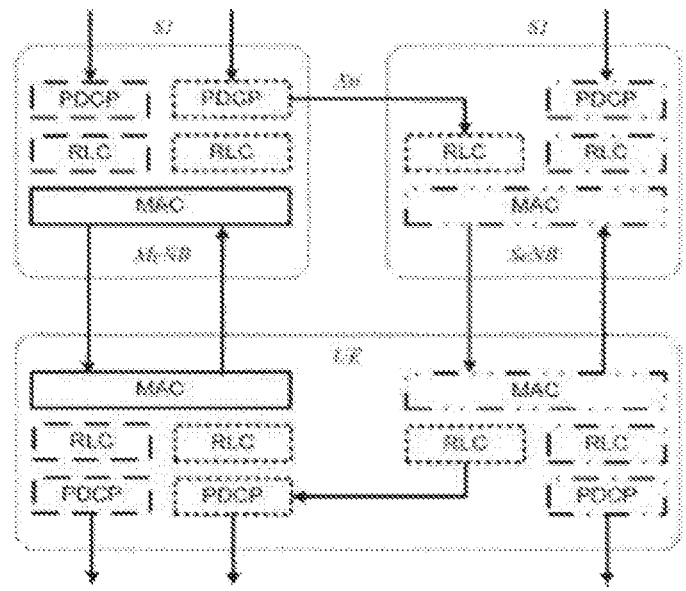
FIG. 3 illustrates an LTE Rel-12 user plane architecture.
Figure 4:
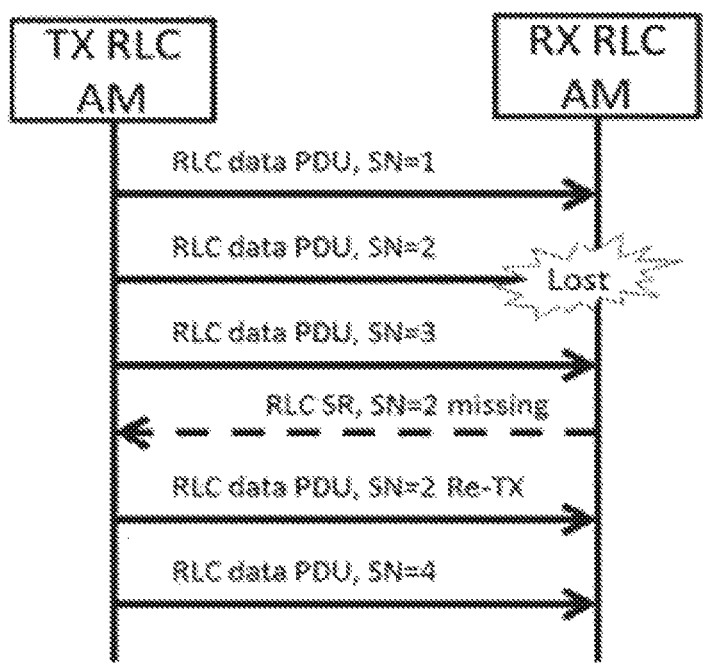
FIG. 4 illustrates the working principle of Radio Link Control Acknowledged Mode.
Figure 5A:
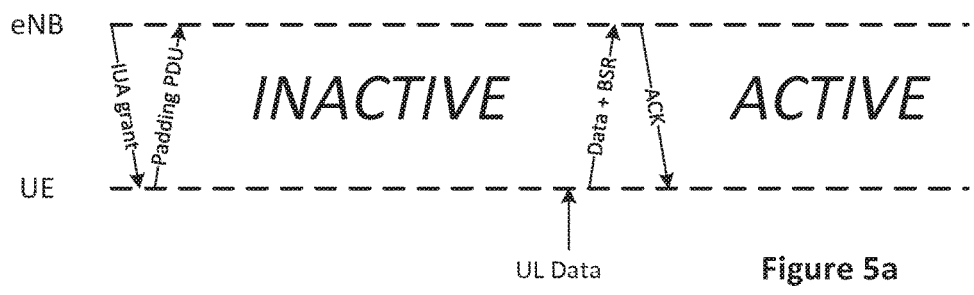
FIG. 5a illustrates the phases of Instant Uplink Access.
Figure 5B:
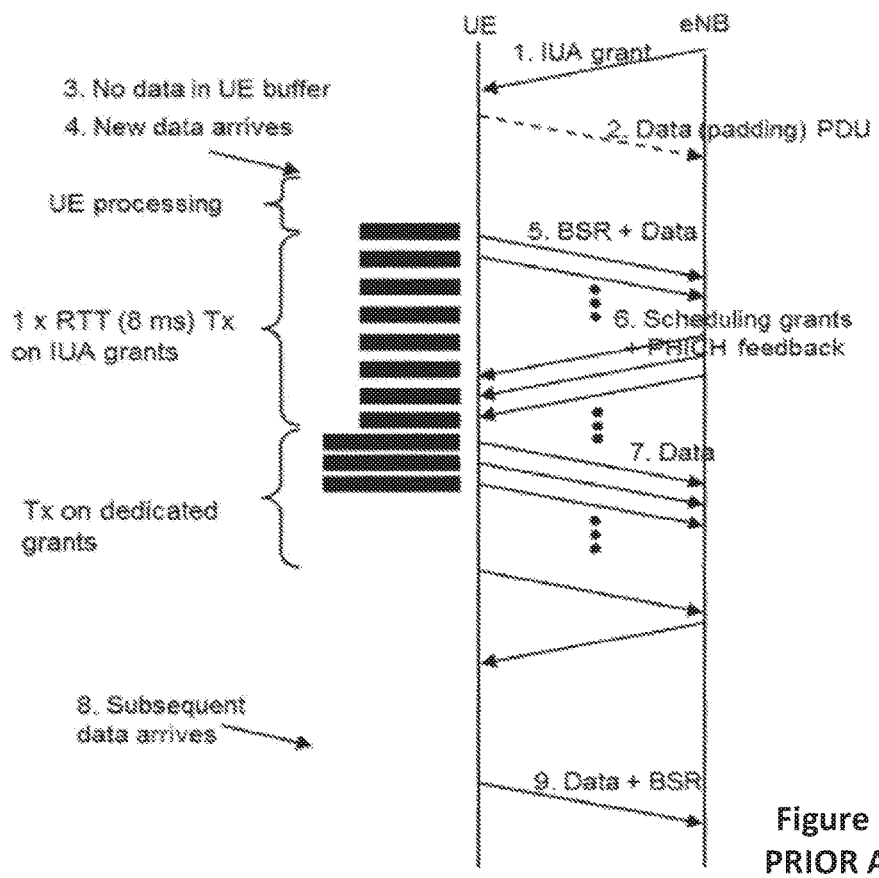
FIG. 5b illustrates the phases of Instant Uplink Access in detail.
Figure 6:
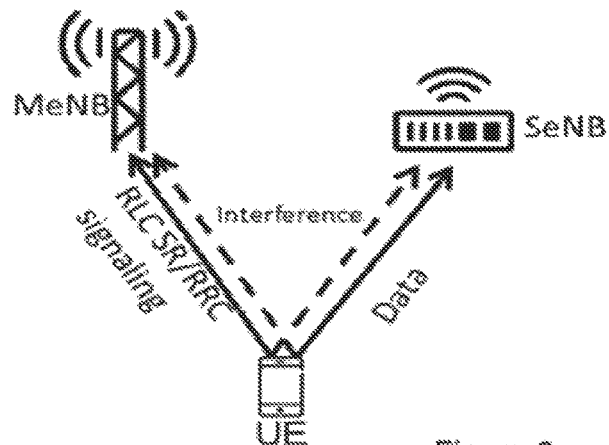
FIG. 6 illustrates cross-interference caused by simultaneous RLC/RRC signaling and data transmissions in the UL from a UE.
Figure 7:
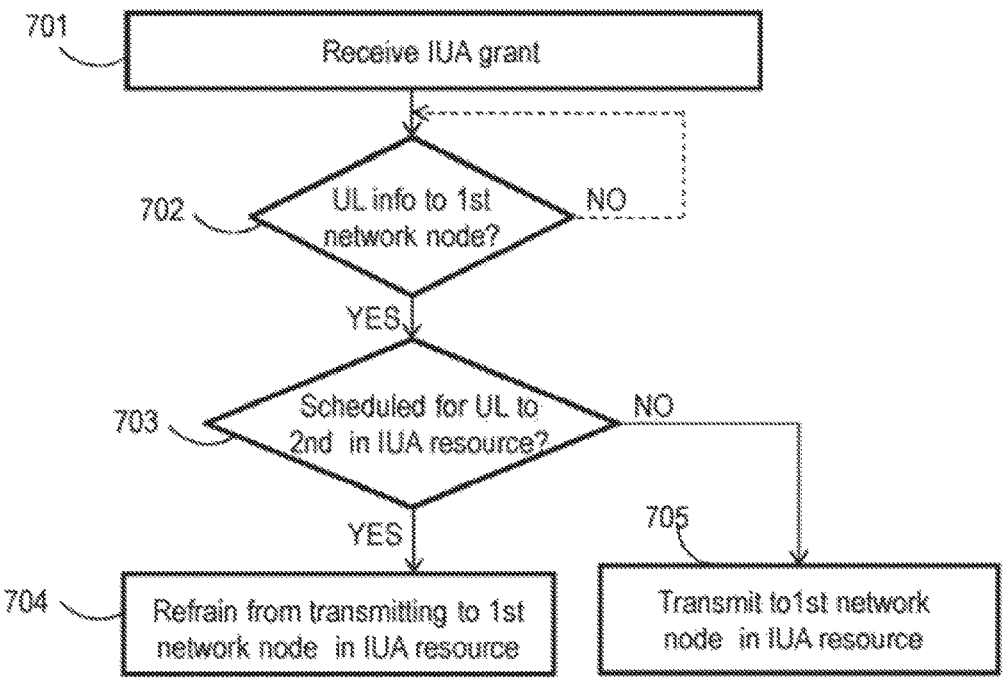
FIG. 7 shows a method to be performed by a UE according to an exemplifying embodiment.

First, exemplifying method embodiments performed by a wireless device, here denoted UE, will be described with reference to FIG. 7. Then, further below, exemplifying method embodiment performed by a first network node will be described with reference to FIG. 8, and then exemplifying method embodiments performed by a second network node will be described with reference to FIG. 9. Embodiments of the UE and network nodes will be described further below FIG. 7 illustrates a method performed by a UE operable in a wireless communication network supporting dual connectivity. The method is suitable e.g. for avoiding or obviating interference caused by contemporaneous UL transmissions to different network nodes. The UE could be a smartphone, a tablet or any other device capable of wireless communication and dual connectivity.

The method illustrated in FIG. 7 is to be performed by the UE when being connected to a first and a second network node. This could also be expressed as that the method is to be performed by the UE when being in dual connectivity with a first and a second network node. In current LTE terminology, one of the two network nodes connected to the UE is a MeNB and the other is a SeNB, as previously described.

The method comprises receiving 701 an Instant Uplink Access, IUA, grant from the first network node, indicating at least a periodicity of a semi-persistent scheduling. The method further comprises, when having information to be transmitted in the UL to the first network node: determining 703 whether being scheduled for UL transmission by the second network node in a resource associated with the IUA grant or not. When not being scheduled, UL information is transmitted 705 to the first network node in the upcoming resource associated with IUA. And, on the other hand, when being scheduled, the method comprises: refraining 704 from transmitting UL information to the first network node in the upcoming resource associated with IUA.

According to this method, the UE will transmit UL information to the first network node in granted IUA resources when not being scheduled for UL transmission by the second network node in these resources.

As previously described, the IUA grant gives the UE permission to transmit in the uplink to the first network node at certain intervals, i.e. with a certain periodicity. When no information is waiting to be transmitted in the uplink to the first network node, the UE will not utilize the granted IUA resources, which is a difference as compared to ordinary semi-persistent scheduling, where the resource is utilized for transmission irrespective of whether there is any information to be transmitted. The periodicity of the IUA resources may be quite frequent. In FIG. 7, the detection of presence of information to be transmitted in the UL to the first network node is illustrated by an action 702, where the UE determines whether there is any information waiting to be transmitted or not. The determining 703 of whether being scheduled for UL transmission to the second network node may be performed e.g. based on UL grants received from the second network node, such that when there is no UL grant associated with an upcoming IUA resource, the UE may determine, i.e. conclude, that it is not scheduled for UL transmission to the second network node in this IUA resource.

By coordinating the UL transmissions according to the method described above, the UE may obviate interference caused by simultaneous or contemporaneous UL transmissions to the first and the second network node. The method enables the UE to coordinate the UL transmissions such that it transmits in the UL to one network node at the time. According to an exemplifying embodiment, the dual connectivity may be of so-called "intra frequency" type, where the UL communication to the first and the second network node overlaps in frequency, and thereby would cause severe interference to each other if performed simultaneously. However, the method is also applicable for cases with inter-frequency dual connectivity, e.g. where UL transmissions to the first and second network node are to be performed in adjacent or closely located frequency bands, which would cause cross-interference if performed simultaneously.

The refraining 704 from transmission may be performed until the UE is not scheduled by the second network node in an upcoming resource associated with IUA, or, until a predefined period of time has expired. Considering a case where the UE is continuously scheduled for UL transmission by the second network node in all IUA resources, it may be realized that there is a risk that information waiting to be transmitted to the first network node could be kept waiting forever, or at least until it is no longer relevant. Therefore, to obviate such a situation, a timer could be started when there is information waiting to be transmitted to the first network node. If no free IUA resource has been available when the timer expires, the information could be transmitted in an IUA resource even though the UE is scheduled for UL transmission to the second network node in this resource. The UE could then either refrain from transmitting to the second network node in the IUA resource, or, it could transmit both to the first and the second network node in this resource, with the risk of creating interference.

The dual connectivity may be related to UL/DL separation, such that e.g. DL data is received from the first network node, and UL data is transmitted to the second network node. The information to be transmitted in the UL to the first network node would then be control information, such as RLC or RRC information. More examples of this will be given further below.

Figure 8:
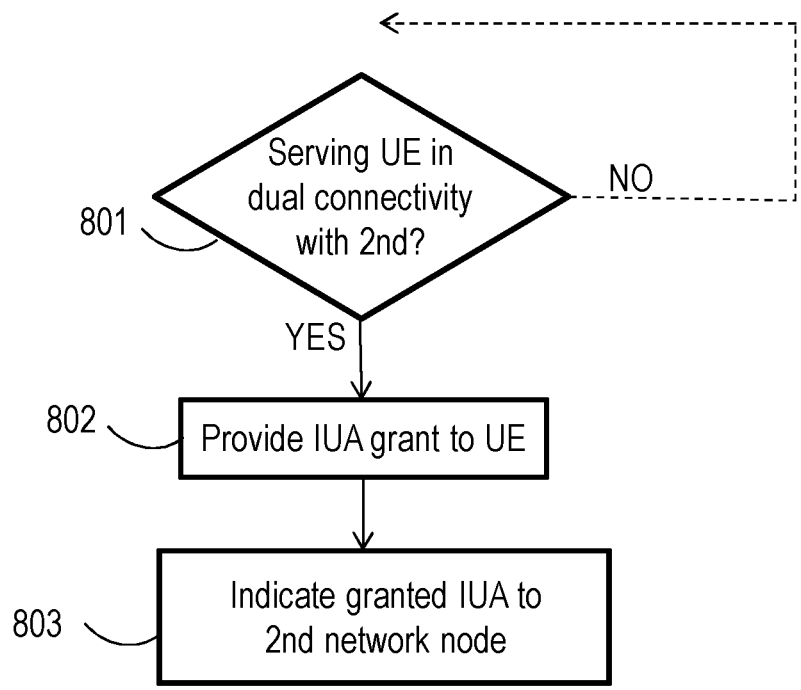
FIG. 8 shows a method to be performed by a first network node, according to an exemplifying embodiment.

FIG. 8 illustrates a method to be performed by a first network node in a communication system supporting dual connectivity. The first network node may be assumed to be operable to serve a UE, i.e. be connected to a UE, which also is connected to a second network node. The method comprises, when serving a UE also being connected to a second network node: providing 802 an IUA grant to the UE, indicating at least a periodicity of a semi-persistent scheduling. The method further comprises indicating 803 the granted IUA to the second network node. By performing this method, the first network node enables the second network node to coordinate UL scheduling of the UE with properties of the IUA grant, such that simultaneous UL transmissions are avoided, and thus also cross interference created by such simultaneous transmissions.

In FIG. 8, the determining of whether the first network node serves a UE in dual connectivity is illustrated as an action 801. The first network node could determine this based on e.g. that the nodes involved in dual connectivity with a UE have information about the other involved nodes. Further, the first network node may receive an acknowledgement or a suggested modification of the IUA from the second network node, as a response to the indicating of the granted IUA. The first network node could then, if possible, modify the IUA grant in accordance with the suggestion from the second network node. In this way, an UL transmission coordination which is acceptable to both network nodes could be achieved. Also here, the dual connectivity may be related to UL/DL separation, and the first network node may serve the UE in the DL, but expect to receive control information in the granted IUA resources.

The first network node and the second network node may communicate with the UE in overlapping frequency bands, i.e. the dual connectivity may be of intra-frequency type. The first network node could be a MeNB or a SeNB in relation to the UE. In some embodiments, the indicating 803 of the granted IUA may be performed in response to a request received from the second network node.

Figure 9:
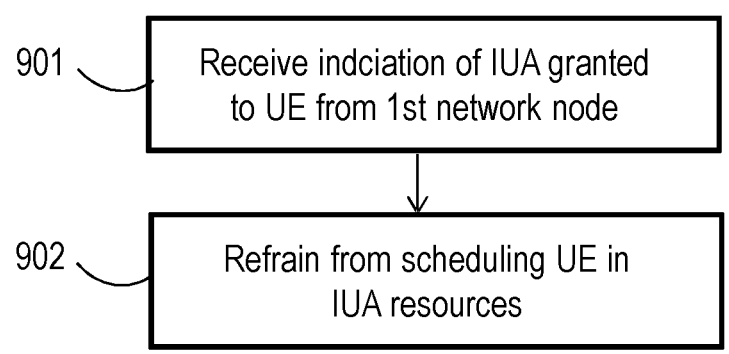
FIG. 9 shows a method to be performed by a second network node, according to an exemplifying embodiment.

FIG. 9 illustrates a method to be performed by a second network node in a wireless communication system supporting dual connectivity. The method corresponds to the method performed by the first network node described above. The method comprises, when serving a UE also being connected to a first network node: receiving 901 an indication from the first network node of an IUA grant for the UE. The IUA grant is associated with at least a periodicity of a semi-persistent scheduling. The method further comprises refraining 902 from scheduling the UE in UL resources associated with the IUA grant. That is, the second network node may determine, based on the indication received from the first network node, which resources (IUA resources) that may be used by the UE for UL transmissions to the first network node, and refrain from scheduling the UE for UL transmission in these resources. By performing this method, simultaneous UL transmissions to the first and the second network node may be avoided, and thus also cross interference caused by such simultaneous transmissions.

The second network node may send an acknowledgement to the first network node in response to the received indication. Alternatively, or in addition, the second network node could suggest a modification of the IUA as a response to the received indication. In some embodiments, the second network node may send a request for information about any IUA grants to the first network node. The indication could then be received in response to such a request. As previously described, the dual connectivity may be related to DL/UL separation, and the first network node may serve the UE in the UL. The second network node could be a SeNB or a MeNB in relation to the UE.

Below some further exemplifying embodiments will be described, in which it is assumed that the dual connectivity is related to DL/UL separation. In relation to the embodiments described above, the node denoted "downlink node" managing a "downlink cell" below would correspond to the first network node, and the node denoted "uplink node" managing an "uplink cell" would correspond to the second network node.

In an exemplifying embodiment of the solution described herein, the MeNB manages a downlink cell and the SeNB manages an uplink cell in relation to the UE to which both eNBs are connected. This scenario is used as the example setup in the embodiments described below. We note however that the concept is applicable also for the opposite case where the MeNB manages the uplink cell and the SeNB manages the downlink cell or both cells are managed by an S(M)eNB.

Periodic Solution

Figure 10:
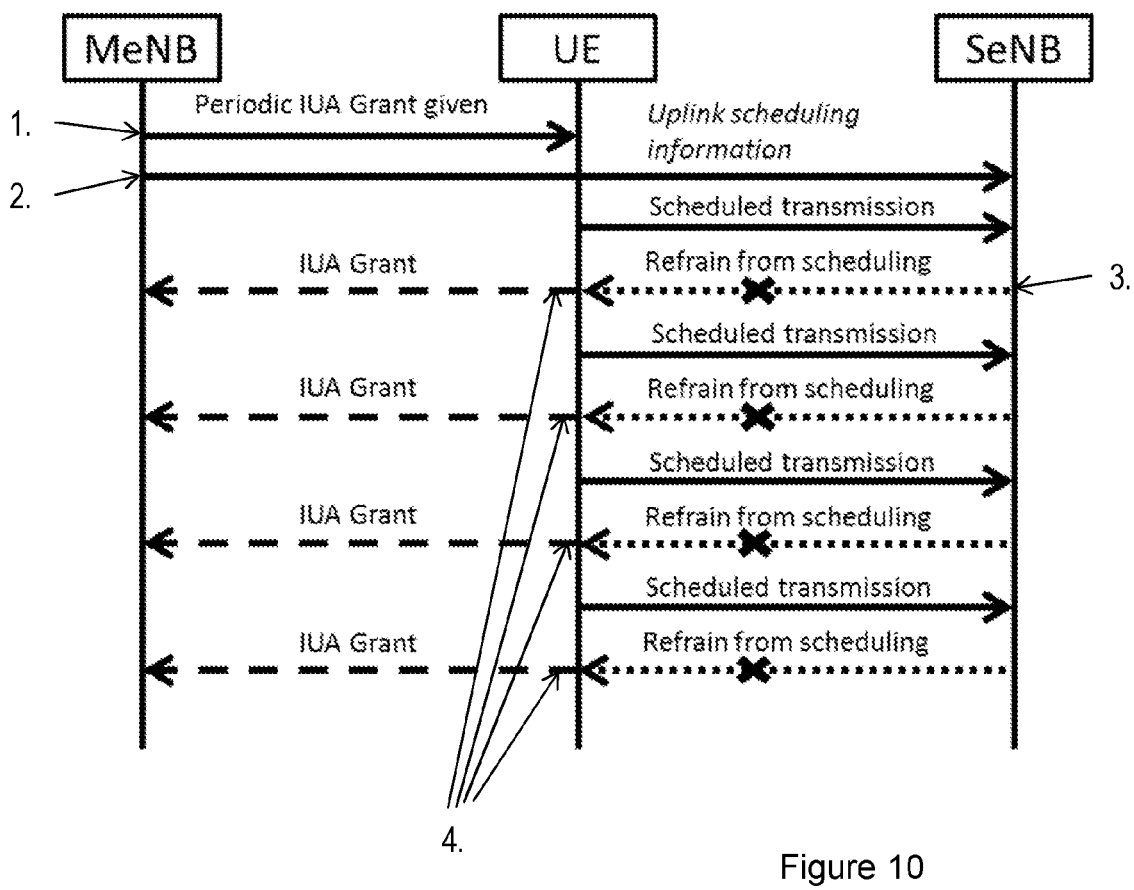
FIG. 10 is a signaling diagram illustrating a so-called periodic version of the solution.

One example of a network side controlled periodic implementation of the solution is depicted in FIG. 10 and described below. This periodic embodiment corresponds to the methods performed by the first and the second network node described above in conjunction with FIGS. 8-9.

1. The eNB serving the downlink cell, which is typically the MeNB, configures a UE in UL/DL separation with a periodic IUA grant. The period of the IUA grant should be >1 to allow for uplink transmissions also in the uplink cell. To share uplink resources in the downlink cell among a group of UEs, contention based IUA grant can be used.

2. The eNB serving the downlink cell informs the eNB serving the uplink cell, typically the SeNB, of the periodic IUA grant in the downlink cell via UL scheduling coordination information. The report includes the periodicity and starting subframe related to system frame number (SFN) of the IUA grant.

3. The eNB serving the uplink cell refrains from scheduling the UE in UL/DL separation in the subframes where the UE has an IUA grant in the downlink cell.

4. When UE has an UL transmission to be sent in the downlink cell, it uses the IUA grant to send that transmission in a transmission resource associated with the IUA grant. If no information is waiting to be transmitted in the UL in the downlink cell, the IUA resources are not utilized for transmission.

In any embodiments of the solution described herein, the periodic IUA configuration may be modified to apply only in certain frequency resources. With this modification, UL information, such as RLC or RRC related messages, to be sent in the IUA resources, is sent in those certain allocated frequency resources in the downlink cell and data may be scheduled in the uplink cell on the rest of the frequency resources in the same subframe.

An advantage of the periodic solution is that whenever the UE has something to transmit in the downlink cell during an "IUA granted" subframe, it can transmit in this subframe without causing self-interference in the uplink cell.

Further, the periodic solution provides a higher reliability in the delivery of the uplink transmissions in the downlink cell than the dynamic solution, since the UE is guaranteed to transmit in the IUA granted periodic subframe when it has something to transmit. However, the periodicity of the IUA grant may add extra delay to the transmission time.

Dynamic Solution

An eNB managing the downlink cell of a UE capable of UL/DL separation, typically the MeNB, may send an IUA grant that the UE shall use for uplink transmissions of RLC or RRC signaling in the downlink cell, e.g. to the MeNB if assuming that this is the downlink node managing the downlink cell. The IUA grant may be sent e.g. triggered by activation of the UL/DL separation or at some other, later occasion. The periodicity of the IUA grant may be any within the configurable range, i.e. also 1 is allowed to allow for minimum uplink latency in this case. To share uplink resources in the downlink cell among a group of UEs, contention based IUA grant can be used. This allows the UE to dynamically monitor for unscheduled subframes in the uplink cell and transmit the RLC or RRC uplink signaling in the downlink cell during those free subframes. Optionally, a timer denoted e.g. Interference Control Timeout (ICT) timer could be configured to the UE. The timer defines how long the UE may wait for the opportunity to send the RLC or RRC related information using a free subframe. After expiration of the Interference Control Timeout timer, the UE uses next subframe to send RRC/RLC related information to the downlink cell. UE may or may not drop the data transmission to the UL cell. From network perspective, dropping of the data transmission would correspond to a lost packet which would be NACKed to the UE by the uplink cell.

Figure 11:
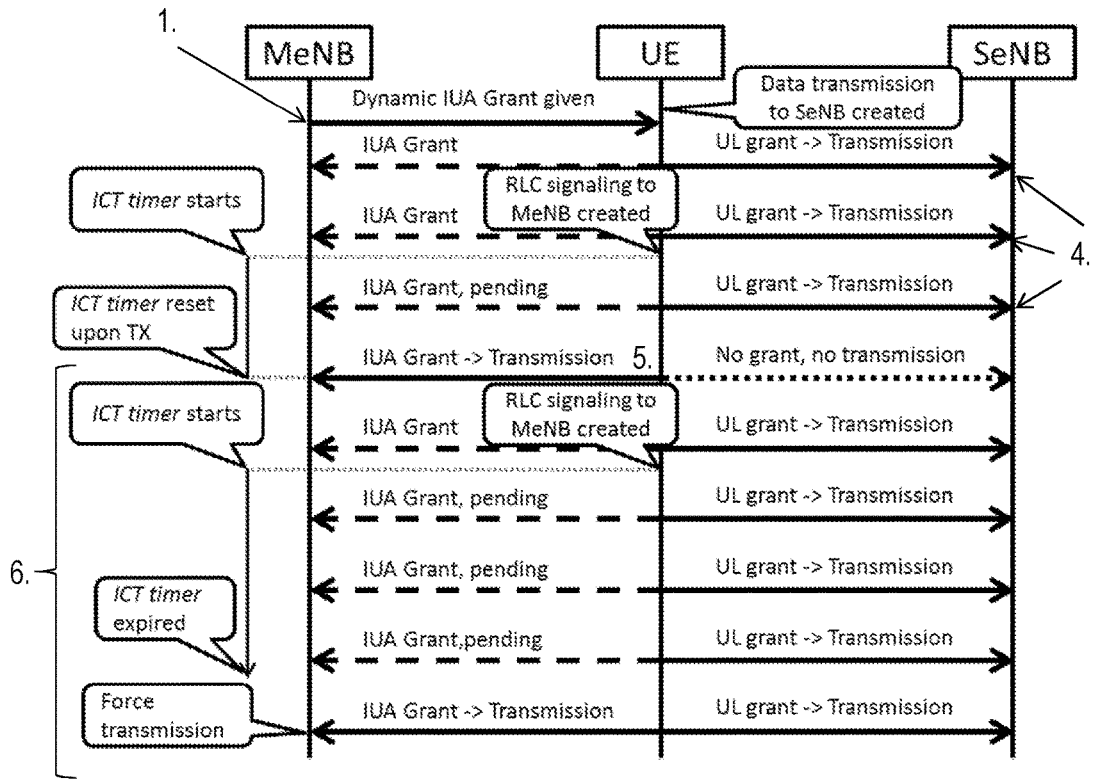
FIG. 11 is a signaling diagram illustrating a so-called dynamic version of the solution.
Figure 12:
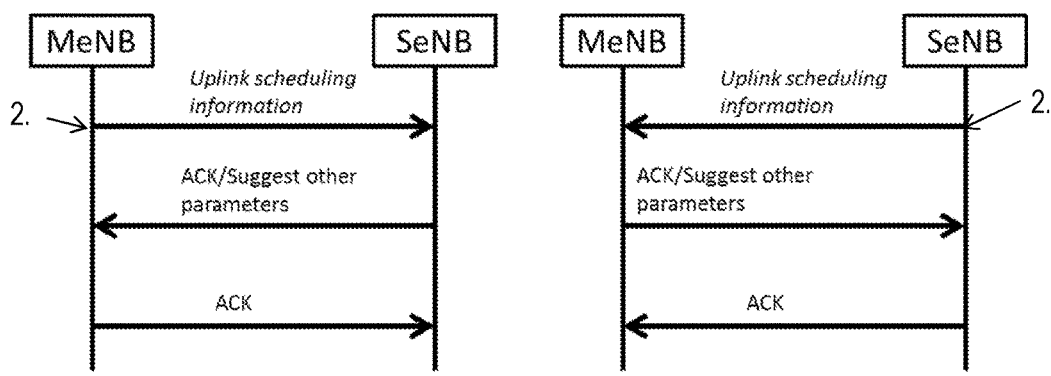
FIG. 12 is a signaling diagram illustrating signaling between the first and the second network node when activating the scheduling coordination according to exemplifying embodiments.

An exemplifying embodiment of the dynamic solution may include the following steps, described below with reference to FIGS. 11 and 12:

1. The eNB serving the downlink cell configures a UE in UL/DL separation with a periodic IUA grant. The period of the IUA grant can be >=1. To share uplink resources in the downlink cell among a group of UEs, a contention based IUA grant can be used (see FIG. 11).
2. The eNB controlling the downlink cell may inform the eNB controlling the uplink cell of the IUA grant details by sending UL scheduling coordination information. (see FIG. 12). In FIG. 12, both the alternative that the MeNB is controlling the downlink cell (to the left) and the alternative that the SeNB is controlling the downlink cell (to the right) are illustrated.
3. Before sending RLC or RRC signaling on the IUA grant in the downlink cell, the UE checks whether it has a valid uplink grant in corresponding subframe of the uplink cell (not shown in figures).
4. If the UE has a valid grant in the uplink cell, it transmits on that grant, and delays the uplink transmission in the downlink cell. (see FIG. 11)
5. If the UE does not have a valid grant in the uplink cell, and it has a pending uplink transmission in the downlink cell, the UE transmits the pending uplink transmission using the IUA grant in the downlink cell. (see FIG. 11)
6. If the UE is configured with an ICT timer, the timer is started when RLC or RRC signaling is generated at the UE. When the ICT timer expires, the UE sends the RLC or RRC signaling on the IUA grant in the downlink cell even if the subframe is not free in the uplink cell. The UE may or may not drop the data transmission to the UL cell. (see FIG. 11)
7. The UE may report a buffer status report (BSR) towards the uplink cell that includes also BSR information of the downlink cell. When the uplink eNB receives this report, it can take it into account when scheduling UL data. For example, if the IUA grant information is known to the uplink eNB, and it finds out via a BSR related to the downlink eNB, it may restrict UL data scheduling assignments to the UE e.g. in a following number of subframes associated with IUA grant resources.
8. Another option is that UE sends a request, to the uplink eNB, to not to be scheduled in a following x number of IUA grant subframes. The number x may be included in the report or preknown, e.g. preconfigured, to the uplink eNB.

In the dynamic solution there may be granted IUA resources for the UE in up to every subframe in the downlink cell, which allows a low transmission delay e.g. for uplink RLC or RRC control transmissions in the downlink cell. Further, the dynamic solution provides a more efficient resource usage than the periodic solution, since an IUA resource may be used for uplink cell transmissions in case the UE does not have anything to transmit in the downlink cell within the IUA resource.

Hardware Implementations

The methods and techniques described above may be implemented in wireless devices and/or network nodes. Above, in association with describing the method embodiments, it is exemplified in which nodes in an LTE system the methods are intended to be implemented. Corresponding nodes in other communication systems may be denoted differently.

Wireless Device, UE, FIG. 13a-13c

An exemplifying embodiment of a wireless device, such as the one exemplified as a UE, and denoted "UE" above, is illustrated in a general manner in FIG. 13a. The wireless device will also here be denoted UE, as an example. The UE 1300 is configured to perform at least one of the method embodiments described above, e.g. with reference to any of FIGS. 7 and 11. The UE 1300 is associated with the same technical features, objects and advantages as the previously described method embodiments. The UE will be described in brief in order to avoid unnecessary repetition.

The UE may be implemented and/or described as follows:

The UE 1300 is configured to support dual connectivity and to be operable in a communication network supporting dual connectivity. The UE 1300 comprises processing circuitry 1301 and a communication interface 1302. The processing circuitry 1301 is configured to, when the UE is connected to a first and a second network node, cause the UE 1300 to receive an IUA grant from the first network node, indicating at least a periodicity of a semi-persistent scheduling. The processing circuitry 1301 is further configured to, when having information to be transmitted in the UL to the first network node: determine whether being scheduled for UL transmission by the second network node in a resource associated with the IUA grant. The processing circuitry 1301 is further configured to, when not being scheduled: transmit UL information to the first network node in the resource associated with IUA; and further to, when being scheduled: refrain from transmitting the UL information to the first network node in the resource associated with IUA. The communication interface 1302, which may also be denoted e.g. Input/Output (I/O) interface, includes a network interface for sending data to and receiving data from other network nodes.

The processing circuitry 1301 could, as illustrated in FIG. 13*b*, comprise processing means, such as a processor 1303, e.g. a CPU, and a memory 1304 for storing or holding instructions. The memory would then comprise instructions, e.g. in form of a computer program 1305, which when executed by the processing means 1303 causes the UE 1300 to perform the actions described above.

An alternative implementation of the processing circuitry 1301 is shown in FIG. 13*c*. The processing circuitry here comprises a receiving unit 1306, configured to cause the UE to receive an Instant Uplink Access, IUA, grant from the first network node, indicating at least a periodicity of a semi-persistent scheduling. The processing circuitry further comprises a determining unit 1307, configured to cause the UE to, at least when having information to be transmitted in the UL to the first network node: determine whether being scheduled for UL transmission by the second network node in a resource associated with the IUA grant. The processing circuitry further comprises a coordinating unit 1308, configured to cause the UE to, when not being scheduled by the second network node: transmit UL information to the first network node in the resource associated with IUA, and, when being scheduled by the second network node: refrain from transmitting the UL information to the first network node in the resource associated with.

The UE described above could be configured for the different method embodiments described herein, such as refraining from transmission until the wireless device is not scheduled by the second network node in an upcoming resource associated with IUA, or, until a predefined period of time has expired; and/or transmitting UL information to the first network node in a resource associated with IUA irrespective of whether the wireless device is scheduled in the resource by the second network node when the predefined period has expired without access to any free resources associated with IUA.

The UE 1300 may be assumed to comprise further functionality, for carrying out regular UE functions.

Figure 14A:
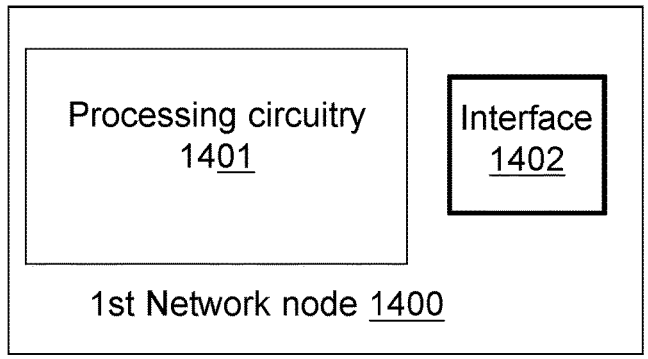
FIGS. 14a-14c illustrates implementations of a first network node according to exemplifying embodiments.
Figure 14B:
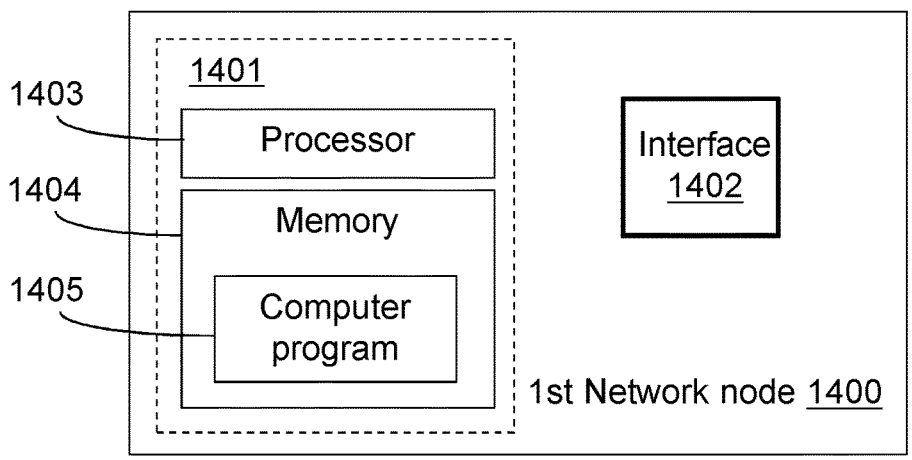
Figure 14C:
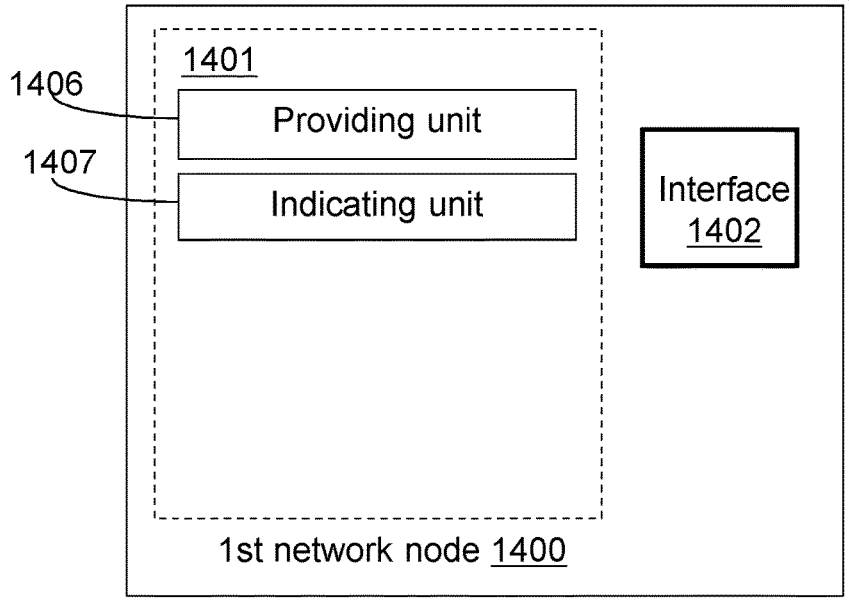

First Network Node, FIGS. 14*a*-14*c*

An exemplifying embodiment of a first network node, such as the one exemplified as a MeNB, and denoted "MeNB" above, is illustrated in a general manner in FIG. 14*a*. The first network node 1400 is configured to perform at least one of the method embodiments described above, e.g. with reference to any of FIGS. 8 and 10-12. The first network node 1400 is associated with the same technical features, objects and advantages as the previously described method embodiments. The first network node will be described in brief in order to avoid unnecessary repetition.

The first network node may be implemented and/or described as follows:

The first network node 1400 is configured to support dual connectivity and to be operable in a communication network supporting dual connectivity. The first network node 1400 comprises processing circuitry 1401 and a communication interface 1402. The processing circuitry 1401 is configured to, when serving a wireless device which is also connected to a second network node: provide an IUA grant to the wireless device, indicating at least a periodicity of a semi-persistent scheduling. The processing circuitry 1401 is further configured to indicate the granted IUA to the second network node. The communication interface 1402, which may also be denoted e.g. Input/Output (I/O) interface, includes a network interface for sending data to and receiving data from other network nodes.

The processing circuitry 1401 could, as illustrated in FIG. 14*b*, comprise processing means, such as a processor 1403, e.g. a CPU, and a memory 1404 for storing or holding instructions. The memory would then comprise instructions, e.g. in form of a computer program 1405, which when executed by the processing means 1403 causes the first network node 1400 to perform the actions described above.

An alternative implementation of the processing circuitry 1401 is shown in FIG. 14*c*. The processing circuitry here comprises a providing unit 1406, configured to cause the first network node to provide an IUA grant to the wireless device, indicating at least a periodicity of a semi-persistent scheduling. The processing circuitry further comprises an indicating unit 1407, configured to cause the first network node to indicate the granted IUA to the second network node.

The first network node described above could be configured for the different method embodiments described herein, such as UL/DL separation and communication with the second network node in regard of the IUA grant.

The first network node 1400 may be assumed to comprise further functionality, for carrying out regular network node functions.

Figure 15A:
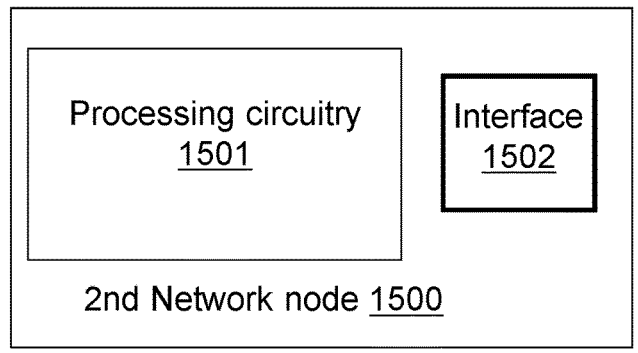
Figure 15B:
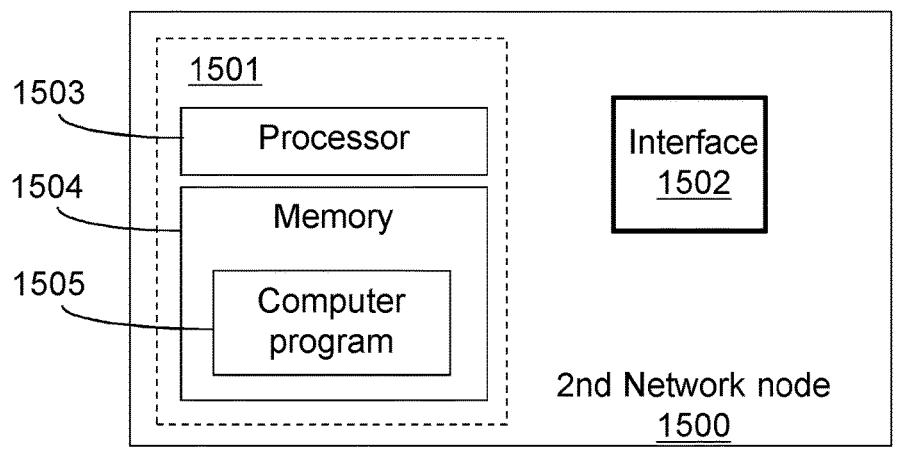
Figure 15C:
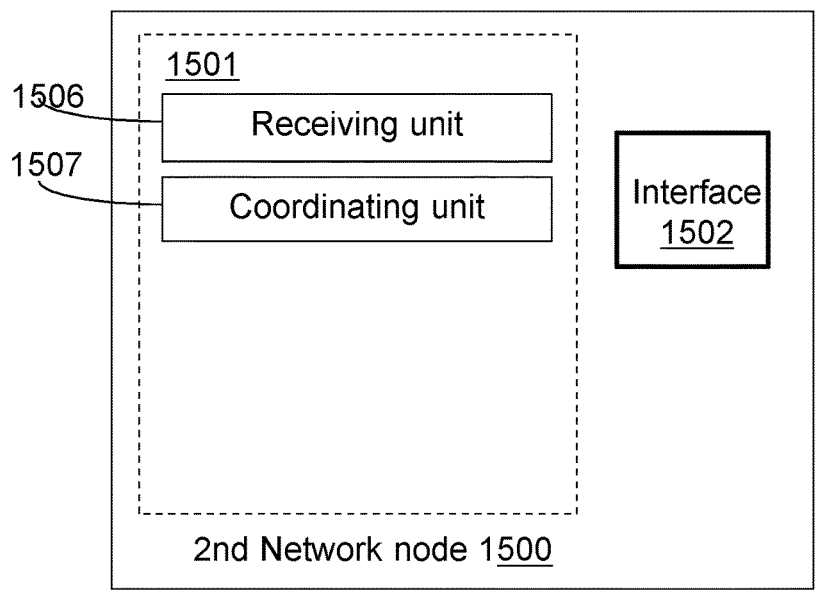

Second Network Node, FIGS. 15*a*-15*c*

An exemplifying embodiment of a second network node, such as the one exemplified as a SeNB, and denoted "SeNB" above, is illustrated in a general manner in FIG. 15*a*. The second network node 1500 is configured to perform at least one of the method embodiments described above, e.g. with reference to any of FIGS. 9 and 10-12. The second network node 1500 is associated with the same technical features, objects and advantages as the previously described method embodiments. The second network node will be described in brief in order to avoid unnecessary repetition.

The second network node may be implemented and/or described as follows:

The second network node 1500 is configured to support dual connectivity and to be operable in a communication network supporting dual connectivity. The second network node 1500 comprises processing circuitry 1501 and a communication interface 1502. The processing circuitry 1501 is configured to, when serving a wireless device which is also connected to a first network node: receive an indication from the first network node of an IUA grant for the wireless device, the IUA grant being associated with at least a periodicity of a semi-persistent scheduling. The processing circuitry 1501 is further configured to refrain from scheduling the wireless device in the UL resources associated with the IUA grant. The communication interface 1502, which may also be denoted e.g. Input/Output (I/O) interface, includes a network interface for sending data to and receiving data from other network nodes.

The processing circuitry 1501 could, as illustrated in FIG. 15*b*, comprise processing means, such as a processor 1503, e.g. a CPU, and a memory 1504 for storing or holding instructions. The memory would then comprise instructions, e.g. in form of a computer program 1505, which when executed by the processing means 1503 causes the second network node 1500 to perform the actions described above.

An alternative implementation of the processing circuitry 1501 is shown in FIG. 15c. The processing circuitry here comprises a receiving unit 1506, configured to cause the second network node to receive an indication from the first network node of an IUA grant for the wireless device, the IUA grant being associated with at least a periodicity of a semi-persistent scheduling. The processing circuitry further comprises a coordinating unit 1507, configured to cause the second network node to refrain from scheduling the wireless device in the UL resources associated with the IUA grant.

The second network node described above could be configured for the different method embodiments described herein, such as UL/DL separation and communication with the first network node in regard of the IUA grant.

The second network node 1500 may be assumed to comprise further functionality, for carrying out regular network node functions.

Concluding Remarks

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes. At least part of the network nodes described above may be implemented in a so-called cloud solution, referring to that the implementation may be distributed, and the network nodes therefore may be so-called virtual nodes or virtual machines.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

It should be noted that although terminology from 3GPP LTE has been used in this disclosure to exemplify the invention, this should not be seen as limiting the scope of the invention to only the aforementioned system. Other wireless systems which support a broadcast service may also benefit from exploiting the ideas covered within this disclosure.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

ABBREVIATIONS

ABS Almost Blank Subframe
ACK Acknowledgement
AM Acknowledged Mode
ARQ Automatic Repeat request
BSR Buffer Status Report
CRE Cell Range Expansion
C-RNTI Cell Radio Network Temporary Identity
CSO Cell Selection Offset
DC Dual Connectivity
DL Downlink
DRX Discontinuous Reception
IUA Instant Uplink Access
MAC Medium Access Control
MCG Master Cell Group
MeNB Master eNB PDCCH Physical Downlink Control Channel
PDCP Packet Data Convergence Protocol
PDSCH Physical Downlink Shared Channel
PDU Protocol Data Unit
PHICH Physical HARQ Indication Channel
PUCCH Physical Uplink Control Channel
PUSCH Physical Uplink Shared Channel
RLC Radio Link Control
RRC Radio Resource Control
RSRP Reference Signal Received Power
SCG Secondary Cell Group
SeNB Secondary eNB
SPS Semi-Persistent Scheduling
SR Scheduling Request
TM Transparent Mode
UE User Equipment
UL Uplink
UM Unacknowledged Mode

The invention claimed is:

1. A method performed by a wireless device in a communication network supporting dual connectivity, the method comprising:
when being connected to a first and a second network node:
receiving an Instant Uplink Access, IUA, grant from the first network node, indicating at least a periodicity of a semi-persistent scheduling; and
when having information to be transmitted in the UL to the first network node:
determining whether being scheduled for UL transmission by the second network node in a resource associated with the IUA grant, and:
when not being scheduled:
transmitting UL information to the first network node in the resource associated with IUA,
and, when being scheduled:
refraining from transmitting the UL information to the first network node in the resource associated with IUA.

2. Method according to claim 1, wherein the refraining from transmission is performed until the wireless device is not scheduled by the second network node in an upcoming resource associated with IUA, or, until a predefined period of time has expired.

3. Method according to claim 2, wherein, when the predefined period has expired without any resources associated with IUA not scheduled by the second network node:
transmitting UL information to the first network node in a resource associated with IUA irrespective of whether the wireless device is scheduled in the resource by the second network node.

4. Method according to claim 1 wherein the dual connectivity is related to DL/UL separation.

5. Method according to claim 1, wherein the information to be transmitted in the UL to the first network node is control information.

6. Method according to claim 1, wherein the dual connectivity is intra-frequency dual connectivity.

7. A computer program, comprising a non-transitory computer readable storage medium including instructions which, when executed on at least one processor, cause the at least one processor to carry out the method according to claim 1.

8. A wireless device operable in a communication network supporting dual connectivity, the wireless device being configured to:
when being connected to a first and a second network node:
receive an Instant Uplink Access, IUA, grant from the first network node, indicating at least a periodicity of a semi-persistent scheduling; and to:
when having information to be transmitted in the UL to the first network node:
determine whether being scheduled for UL transmission by the second network node in a resource associated with the IUA grant, and to:
when not being scheduled:
transmit UL information to the first network node in the resource associated with IUA,
and, when being scheduled:
refrain from transmitting the UL information to the first network node in the resource associated with IUA.

9. Wireless device according to claim 8, being configured to perform the refraining from transmission until the wireless device is not scheduled by the second network node in an upcoming resource associated with IUA, or, until a predefined period of time has expired.

10. Wireless device according to claim 9, being configured to,
when the predefined period has expired without any resources associated with IUA being not scheduled by the second network node:
transmit UL information to the first network node in a resource associated with IUA irrespective of whether the wireless device is scheduled in the resource by the second network node.

11. Wireless device according to claim 8, wherein the dual connectivity is related to DL/UL separation.

12. Wireless device according to claim 8, wherein the information to be transmitted in the UL to the first network node is control information.

13. Wireless device according to claim 8, wherein the dual connectivity is intra-frequency dual connectivity.

* * * * *